United States Patent
Millikin

(12) 
(10) Patent No.: US 9,497,558 B1
(45) Date of Patent: Nov. 15, 2016

(54) BODILY FUNCTION SOUND ANONYMIZATION

(71) Applicant: Andrew Robert Millikin, South Burlington, VT (US)

(72) Inventor: Andrew Robert Millikin, South Burlington, VT (US)

(*) Notice: Subject to any disclaimer, the term of this patent is extended or adjusted under 35 U.S.C. 154(b) by 8 days.

(21) Appl. No.: 14/749,215

(22) Filed: Jun. 24, 2015

Related U.S. Application Data

(60) Provisional application No. 62/018,051, filed on Jun. 27, 2014.

(51) Int. Cl.
*H04R 29/00* (2006.01)
*H04R 1/08* (2006.01)

(52) U.S. Cl.
CPC ............... *H04R 29/00* (2013.01); *H04R 1/08* (2013.01)

(58) Field of Classification Search
CPC .................................. H04R 29/00; H04R 1/08
See application file for complete search history.

(56) References Cited

U.S. PATENT DOCUMENTS

| | | | | |
|---|---|---|---|---|
| 3,715,549 A * | 2/1973 | Kraff | ...................... | A47K 17/00 200/330 |
| 4,849,742 A * | 7/1989 | Warrington | ............ | G08B 21/22 340/545.6 |
| 5,008,964 A * | 4/1991 | Dean | .................. | G09B 19/0076 4/449 |
| 5,560,051 A * | 10/1996 | Butts | .................. | G09B 19/0076 340/604 |
| 5,651,056 A * | 7/1997 | Eting | .................... | H04M 1/271 379/216.01 |
| 5,803,786 A * | 9/1998 | McCormick | ............ | G09F 19/08 119/708 |
| 6,028,520 A * | 2/2000 | Maehre | .................. | A47K 13/24 340/522 |
| 6,072,392 A * | 6/2000 | Henderson | ............... | G08B 1/08 340/539.15 |
| 6,282,732 B1 * | 9/2001 | Krvavica | ................ | E03D 9/007 4/228.1 |
| 7,194,776 B1 * | 3/2007 | Lastuka | .................. | E03D 13/00 340/603 |
| 2004/0155779 A1 * | 8/2004 | Ballard | .................... | G08B 3/10 340/573.1 |
| 2006/0176167 A1 * | 8/2006 | Dohrmann | ........... | G08B 25/001 340/506 |
| 2008/0082022 A1 * | 4/2008 | Brohan | .................. | A61B 5/208 600/573 |
| 2008/0089463 A1 * | 4/2008 | Nakamura | ............... | A61B 5/08 378/4 |
| 2010/0064426 A1 * | 3/2010 | Chikara Imamura | .............. | G08B 21/245 4/314 |
| 2015/0118666 A1 * | 4/2015 | Rokjer | ..................... | G09B 5/04 434/236 |

\* cited by examiner

*Primary Examiner* — Simon Sing

(57) ABSTRACT

Apparatuses, systems, methods, and software for bodily function sound anonymization.

20 Claims, 4 Drawing Sheets

US 9,497,558 B1

BODILY FUNCTION SOUND ANONYMIZATION

RELATED APPLICATION DATA

This application claims the benefit of priority of U.S. Provisional Patent Application Ser. No. 62/018,051, filed on Jun. 27, 2014, and titled "BODILY FUNCTION SOUND ANONYMIZATION," which is incorporated by reference herein in its entirety.

FIELD OF THE INVENTION

The present invention generally relates to the field of amusement devices. In particular, the present invention is directed to bodily function sound anonymization.

BACKGROUND

Using the restroom when others are within earshot can be embarrassing, particularly when making bowel movements. Many people live in close quarters or have bathrooms near common rooms and/or living rooms, and, as such, many people end up hearing other people urinate and/or make bowel movements, which, for some, can be troubling. Accordingly, a new method of anonymizing bodily function sounds is needed in order to allow people to regain their confidence and use restrooms with a newfound freedom they may never have experienced before in their lives.

SUMMARY OF THE DISCLOSURE

Apparatuses, systems, methods, and software for bodily function sound anonymization.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In some aspects, the present invention is directed to bodily function sound anonymization. Devices made in accordance with aspects of the invention may be installed in various locations to mitigate or eliminate embarrassment or other undesirable effects often associated with bodily function sounds. The present inventor has discovered that by recording or otherwise monitoring aspects of sounds that actually take place in particular restrooms or types of restrooms, bodily function sounds produced by users of those restrooms can be effectively anonymized.

Figure 1:
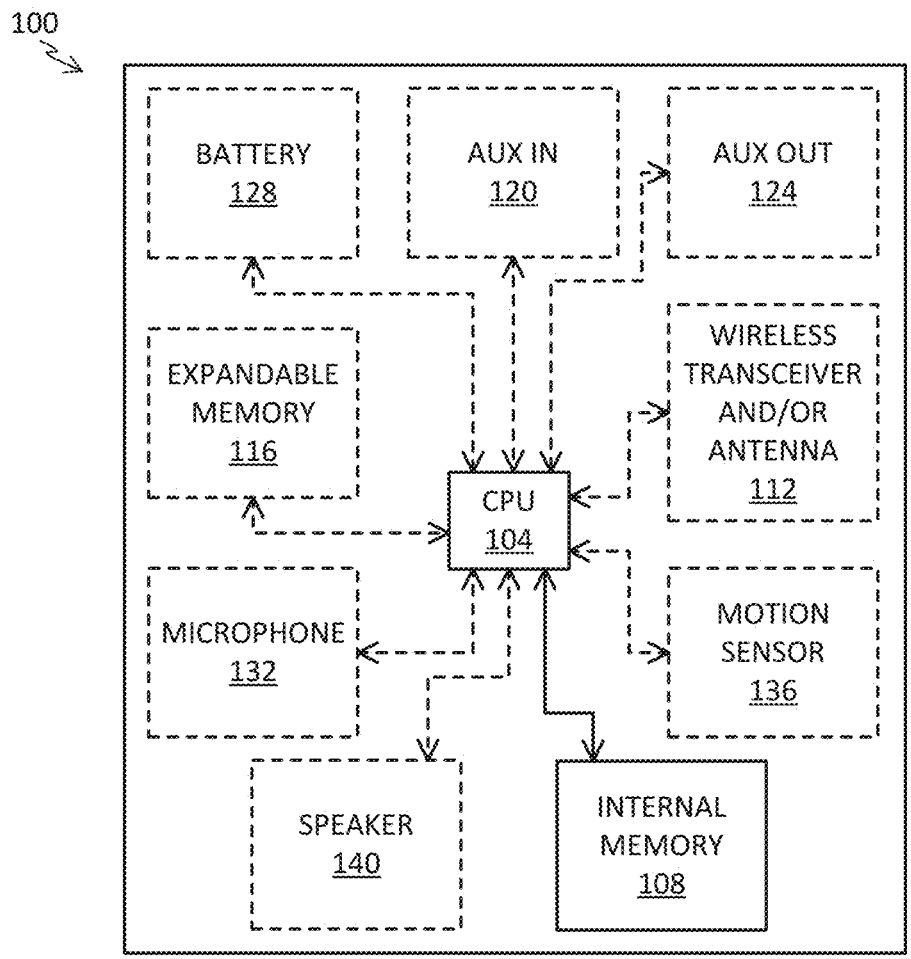
FIG. 1 is a block diagram illustrating an exemplary device made in accordance with the invention.

FIG. 1 illustrates various components of a bodily function sound anonymizer 100 according to one aspect of the invention. In this example, sound anonymizer 100 includes a central processing unit (CPU) 104, internal memory 108, an optional wireless transceiver and/or antenna 112, an optional expandable memory slot 116, optional auxiliary sound/data connections 120, 124, an optional battery 128, a microphone 132, an optional motion sensor 136, and a speaker 140. In use, CPU 104 may receive bodily function sounds from microphone 132, store those sounds in internal memory 108 as stored bodily function sounds, monitor the microphone for further bodily function sounds, and, upon detecting such further bodily function sounds, broadcast (i.e., reproduce) the stored bodily function sounds through speaker 140. In some embodiments, sound anonymizer 100 may be plugged into an electrical outlet. In some embodiments, instead of or in addition to broadcasting stored bodily function sounds upon detection of new bodily function sounds, other detection mechanisms can be used to cause sound anonymizer to play back recorded sounds, such as one or more motion sensor 136 or light sensors placed in proximity to a toilet, weight or contact sensors placed between the toilet seat and bowl, the sounds or vibrations of a user's footsteps, which may be substantially unique to the user, or facial recognition sensors, among others that will be readily apparent to one of ordinary skill in the art after reading this disclosure in its entirety.

In some embodiments, sound anonymizer 100 may include a battery such that the sound anonymizer can be placed in locations that do not have conveniently-placed or any electrical outlets. In some embodiments, sound anonymizer 100 may include auxiliary sound/data connections 120, 124 in order to allow for CPU 104 to utilize external microphones, speakers, or subwoofers (not shown) substantially the same way it can use microphone 132 and speaker 140 (in which case microphone 132 and speaker 140 may optionally be left out of sound anonymizer 100). Additionally or alternatively, auxiliary sound/data connections 120, 124 (which may each comprise multiple connections of the same or different types) may allow for connection to data networks or other systems/devices. Because speakers can be used as microphones and microphones can be used as speakers, in some embodiments, sound anonymizer 100 may be implemented with one or more speaker 140 and/or external speaker (not shown), which may be used as both a speaker and as a microphone. Similarly, although auxiliary sound/data connections 120, 124 are labeled as "out" and "in," respectively, in FIG. 1, one or both may be bidirectional such that an auxiliary microphone may be used as a speaker and an auxiliary speaker may be used as a microphone. In some embodiments, particularly when sound anonymizer 100 is installed on or in close proximity to a toilet (see, e.g., FIG. 2 and FIG. 3), motion sensor 136 may provide CPU 104 with information the CPU can use to determine whether someone has sat down on the toilet and/or whether someone is currently urinating and/or making a bowel movement such that CPU can activate (e.g., begin monitoring) and/or use (e.g., begin recording from) microphone 132. In some embodiments where motion sensor 136 is utilized, microphone 132 may be left out if desired. Motion sensor 136 may be particularly useful in situations where no electrical outlets are accessible and a battery 128 is utilized, because motion sensors, such as those implemented with piezoelectric sensors, can produce outputs without requiring much or any input power source. By directly attaching sound anonymizer 100 with a motion sensor 136, or an external motion sensor (not shown) in communication with sound anonymizer 100, to a toilet, or by installing such a sound anonymizer in close proximity to a toilet, a threshold can be set (either at the time of manufacture or by an end-user, either automatically, automatedly, or manually) such that the anonymizer will turn on to record new sounds and/or play previously recorded sounds only after the anonymizer detects motion related to urination and/or bowel movements (although in some embodiments the anonymizer may focus primarily or exclusively on one or the other). In some embodiments, motion sensor 136 may be used instead of or in addition to microphone 132 to record bodily function sounds, as is known in the sound recording arts.

CPU 104 may distinguish between bodily function sounds and other sounds (such as talking, running water, opening and closing the toilet lid, etc.) by analyzing recordings and/or motion sensor outputs with Fourier analysis, zero-crossing analysis, and/or any other suitable algorithms known in the audio processing arts (optionally utilizing training or learning algorithms, such as one or more support vector machines, or data derived therefrom). In instances where sound anonymizer 100 does not have access to electrical outlets or has intermittent power supply (such as solar) and relies upon battery 128 for power, lower-power algorithms may be preferred unless the battery can support the anonymizer's functions for extended periods of time even when higher-powered algorithms are used. In some embodiments, sound anonymizer 100 may randomly alternate between recording bodily function sounds (i.e., urination and/or bowel movements) and playing a previously recorded bodily function sound, although sound anonymizer 100 may also or alternatively have an external switch or customizable settings (optionally configurable via voice commands, clapping, snapping fingers, or other remote methods) to control whether sound anonymizer 100 will record or play sounds (or both) upon detection of bodily function sounds or to control other aspects of the sound anonymizer. This functionality can enable users who are wary of their bodily function sounds to have sound anonymizer cover up (i.e., anonymize) each of their bodily function sounds, while users who are proud of their bodily function sounds can set sound anonymizer 100 such that each of their bodily function sounds will be faithfully recorded by sound anonymizer for playback at a later date. Sound anonymizer 100 may also be provided with an on/off switch, setting, and/or timed disable switch (not shown). For example, pressing a timed disable switch or issuing a voice command, such as "stop," may disable sound anonymizer 100 for 5-15 minutes, which may be set by the user by, e.g., issuing a voice command ("for five minutes" or "for fifteen minutes"), pressing a switch or waving their hand in front of a motion sensor one time to disable sound anonymizer 100 for 5 minutes, two times to disable sound anonymizer for 10 minutes, or three times to disable sound anonymizer 100 for 15 minutes, etc., such that bashful people can be sure that sound anonymizer 100 will not record their bodily function sounds and/or reproduce bodily function sounds with which they wouldn't want to be associated.

Sound anonymizer 100 users may share their bodily function sounds with other sound anonymizer users via expandable memory 116 (such as a secure digital (SD) memory card and/or universal serial bus (USB) flash drive, among others), aux out 124, wireless transceiver and/or antenna 112. Sound anonymizer 100 users may interface with sound anonymizer 100 through cell phones, computers, other devices, and/or switches, buttons, a display, or other user interface elements provided on or in association with sound anonymizer 100. Sound anonymizer 100 can be connected to an Ethernet, USB, or other cable through one or more of auxiliary sound/data connections 120, 124 to allow a computer or other device lacking wireless capabilities to interface with sound anonymizer. More conveniently, a cell phone or other wireless-capable device may interface with sound anonymizer 100 via wireless transceiver and/or antenna 112. By interfacing with sound anonymizer 100, users can move recorded sounds from internal memory 108 to expandable memory (e.g., SD card or other suitable removable media), although in some embodiments internal memory 108 may be removable and/or one or more sounds in internal memory may automatically be copied to expandable memory 116 such that some or all sounds in anonymizer 100 are always available for transfer simply by removing, e.g., an SD card, plugging it into a computer, and e-mailing or otherwise transferring the sounds to other users. Users may download sounds from one or more sound anonymizers to their cell phone or other devices such that they can immediately (e.g., via an Internet connection) or later upload those sounds to a different sound anonymizer, although in some cases users may lock their sound anonymizer such that certain features are disabled. For example, sound anonymizer may be locked to prevent changes to settings, to prevent disabling of sound playback and/or sound recording and/or storage, to prevent uploading and/or downloading of bodily function sounds by unauthorized users (in which case a password or pin, for example, may be required to upload or download sounds), etc. Further, sample packs of bodily function sounds may be downloaded from the Internet or purchased on pre-loaded SD cards or other data storage devices for use with sound anonymizer 100. This enables those who want an assortment of bodily function sounds to entertain company or others with the sounds of unique and/or remarkable bowel movements every time they use the restroom.

In some embodiments, CPU 104 may analyze microphone 132 and/or motion sensor 136 outputs to recognize individuals based on their bodily function sounds (facial recognition may also be used in combination with a camera, as may fingerprint, voice, weight measured on a floor mat or under the toilet seat, or other recognition means). In some embodiments, upon detecting a bathroom patron urinating and/or making a bowel movement, sound anonymizer 100 may recognize a user by communicating with the user's cell phone and/or may ask the patron for their name via, e.g., speaker 140 and receive their reply via, e.g., microphone 132 (though any sound could be used other than their name provided that the patron can reproduce the sound reliably enough for sound anonymizer to recognize it as coming from the same patron) such that anonymizer 100 can identify them. In this way, the patron may interface with sound anonymizer 100 using a cell phone or other device (e.g., via the cloud and/or other services) and set custom settings to their liking that may be recalled and reapplied each time they return and tell sound anonymizer their name or the anonymizer otherwise recognizes them. For example, a patron may only want sound anonymizer to reproduce only their own previously recorded bodily function sounds, extremely loud bodily function sounds, and/or funny or otherwise entertaining bodily function sounds while they are using the restroom, or a patron may want sound anonymizer to disable itself for 5-15 minutes, or some other period of time, every time sound anonymizer hears them say their name or otherwise recognizes their presence. This functionality can eliminate the requirement for a patron to push a button or otherwise touch or interact with sound anonymizer 100 in order to disable it or customize settings each time they use the restroom, thus reducing hygienic risks. In some embodiments, sound anonymizer may analyze bodily function sounds and identify a patron without them having to speak their name by using Fourier analysis, zero-crossing analysis, and/or other appropriate processing known in the signal processing arts (e.g., by generating signatures for each person as a function of one or more sets of Fourier coefficients derived from sounds or vibrations they have made, though other types of processing and/or identification known in the signal processing arts may be used, optionally utilizing training or learning algorithms, such as one or more support vector machines, or data derived therefrom). In some embodiments, when a patron is using the restroom but has not told sound anonymizer 100 their name and the anonymizer recognizes the patron by other means, sound anonymizer may greet them via, e.g., speaker 140 or other speakers connected to sound anonymizer via auxiliary audio/data connections 120, 124 and/or request their name or ask if the patron would like the anonymizer to inform them of one or more aspects of its capabilities.

In some embodiments, sound anonymizer 100 may monitor or record bodily function sounds and analyze the resulting waveforms to implement more realistic anonymization. For example, sound anonymizer 100 may detect an amplitude envelope and/or other aspects (e.g., maximum amplitude, echo, etc.) of monitored/recorded sounds and apply such an envelope and/or effects associated with such other aspects (e.g., normalize volume/amplitude based on a detected maximum amplitude, apply an echo based on a detected echo, etc.) to other stored sounds and/or sounds recorded in the future. Sound anonymizer 100 may additionally or alternatively select sounds to play as a function of monitored/recorded sounds. For example, a relatively lower amplitude/volume monitored/recorded sound may be anonymized by broadcasting or reproducing a similarly lower amplitude/volume stored sound, while louder sounds can by anonymized by broadcasting a louder stored sound. Similarly, sound anonymizer 100 may perform frequency analysis of a monitored/recorded sound, determine that the sound has a certain frequency/sound profile (e.g., more similar to sounds of a bowel movement than sounds of urination), and broadcast or reproduce one or more stored sounds having a similar frequency/sound profile. In this way, sounds can be customized to particular environments without necessarily using sounds that were actually recorded in those environments.

Figure 2:
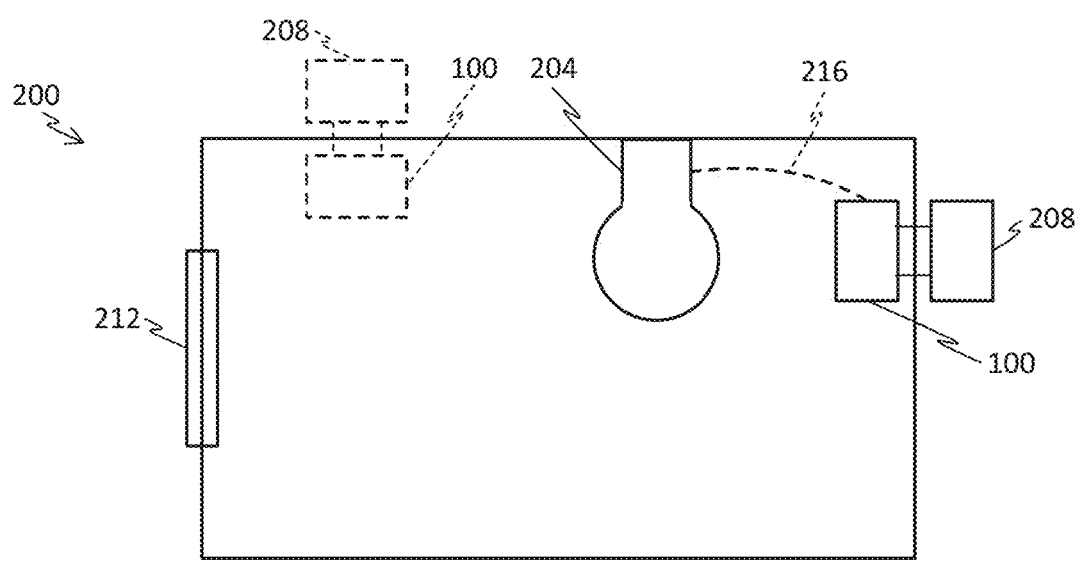
FIG. 2 is a diagram of a bathroom illustrating exemplary locations for installing one or more devices made in accordance with the invention.

FIG. 2 illustrates three exemplary alternative sound anonymizer 100 installations. A bathroom 200 is shown, including a toilet 204, a door 212, and two electrical outlets 208, as well as an optional auxiliary motion or other sensor connection 216 which may connect a sound anonymizer directly to a sensor attached to toilet 204 (not shown), preferably to the bowl, as it receives the most impact from urination/bowel movements. In this exemplary embodiment, if both of electrical outlets 208 are present in bathroom 200, sound anonymizer 100 may be placed near the door 212, near the toilet 204, or two sound anonymizers 100 may be installed, one in each outlet (though more may be used if more outlets are available and/or if battery-operated anonymizers are available). If less than two outlets 208 are present in bathroom 200 or one outlet is in an inconvenient location (e.g., not near door 212 or toilet 204), a single sound anonymizer may be used and placed in an appropriately positioned outlet (such that sound may be emitted through door and/or sound may be recorded from toilet 204) and/or another sound anonymizer may be used with batteries or with a wire extending to a sound anonymizer connected to an outlet or to another outlet in bathroom 200.

In some embodiments, battery-operated sound anonymizers used in tandem with one or more other sound anonymizers connected to electrical outlets may include minimal parts, such as, e.g., a speaker and a wireless transceiver/antenna and/or a wired data connection to one or more of the other sound anonymizers. If all sound anonymizers are battery-operated in a given installation or proximity, wireless capabilities may be minimized and/or eliminated to save power and, if possible, wired communication may be provided between anonymizers. By using two sound anonymizers, as shown in FIG. 2 (including the dashed sound anonymizer), one sound anonymizer 100 (e.g., near toilet 204) can be used primarily for recording bodily function sounds while the other sound anonymizer 100 (e.g., near door 212) can be used to reproduce previously recorded bodily function sounds. This can enable the toilet-proximal sound anonymizer to record new bodily function sounds at the same time that the door-proximal sound anonymizer reproduces previously recorded sounds, particularly when directional speakers/microphones are utilized. In some embodiments, one sound anonymizer 100 (e.g., near door 212) may monitor/record sounds produced by an individual using toilet 204 and/or by another sound anonymizer (e.g., near toilet 204). By analyzing the amplitude/volume and/or other characteristics of sounds produced by an individual (i.e., itself) and/or another sound anonymizer (sounds such as an impulse response resulting from an impulse sound or other sound suitable for characterizing a three-dimensional space), a sound anonymizer may normalize amplitude/volume and/or other characteristics of sounds it broadcasts/reproduces such that the sounds it broadcasts/reproduces will be less distinguishable from sounds produced by the individual. In some embodiments, two or more sound anonymizers may be substantially or literally identical and/or may record and reproduce sounds independently of one another; this can create a cacophony of sound in order to enhance anonymization. In some embodiments, sound anonymizers may communicate with one another such that one or more can take a "slave" position relative to one or more others, as is well known in the computing arts. This can enable users to log into a particular sound anonymizer 100 or other anonymizer controlling device in order to manage some or all sound anonymizers connected to that particular sound anonymizer, either individually or as a group, though the anonymizers may still operate substantially independently in such a configuration if desired. In this way, a user of a particular stall in a public restroom can cause one, two, those within a certain radius or proximity of the user or closest anonymizer to the user, or all sound anonymizers in the restroom to broadcast/reproduce stored sounds to anonymize the user's sounds.

In some embodiments, one or more sound anonymizers 100 may be installed in one or more static locations, such as in one or more electrical outlets 208. However, in some embodiments, sound anonymizers 100 may be portable (e.g., movable between any two electrical outlets and/or, in embodiments using batteries, solar panels, or other non-electrical-outlet power supply or supplies, movable to any desired, suitable location). Further, in some embodiments, sound anonymizer 100 may be implemented in the form of a cellular phone and/or other computing device or a portion thereof. For example, in some embodiments, a cell phone may be transformed into a sound anonymizer 100 through installation of one or more applications or other methods usable for modifying functionality of existing computing devices. However, preferably, users will not have to touch sound anonymizer 100 in any way in order to make use of its functionality in order to ensure that few or no hygienic issues will be raised.

Figure 3:
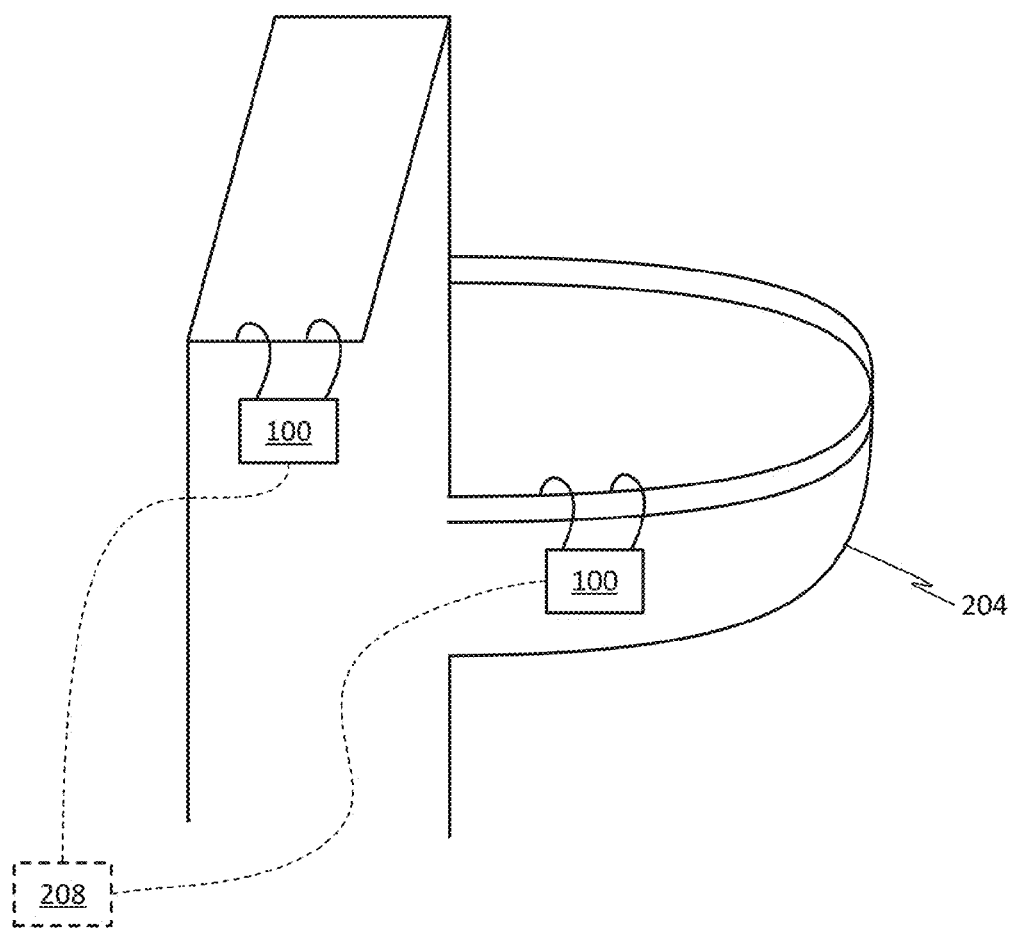
FIG. 3 is a diagram of a toilet illustrating further exemplary locations for installing one or more devices made in accordance with the invention.

FIG. 3 depicts illustrates two further exemplary sound anonymizer 100 installation locations. As shown, sound anonymizers and/or portions thereof may be attached directly to a toilet 204 (only one sound anonymizer may be used, though two or more can add to the anonymization effectiveness), either on the rim, on the tank, or in any other desired location with glue or other appropriate attachments known in the attachment arts, and may be wired to or plugged into an electrical outlet 208 using wires (shown in dash). Sound anonymizers in FIG. 3 are shown with simple hook-like attachments, but obviously one or more of many other types of attachments may be used, such as suction cups, adhesive strips, or others.

Figure 4:
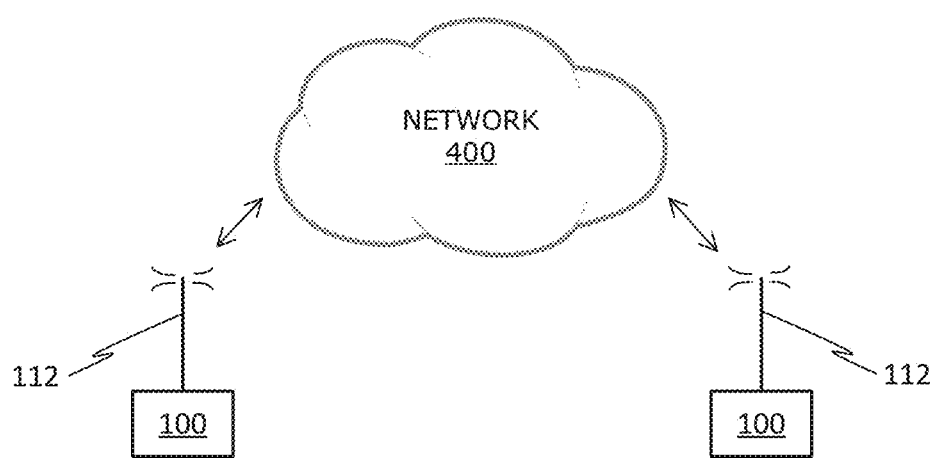
FIG. 4 is a diagram of an exemplary communication system for interfacing one or more devices made in accordance with the invention.

FIG. 4 depicts an exemplary network of sound anonymizers 100. In this example, sound anonymizers may interface with one or more wireless network 400 via, e.g., their respective wireless transceiver and/or antennae 112 and may make their recorded sounds and/or other settings available to other users on a wireless network and/or otherwise, e.g., via the Internet, for download (or modification in the case of settings). Similarly, users may upload one or more recorded sounds to other users sound anonymizers via a wireless network and/or otherwise via the Internet. In this way, an appropriately-configured website or other networked resource can collect some or all sound anonymizer recordings and distribute them as a website administrator, users of the website, and/or the user whose anonymizer originally recorded the sounds desires. Users may opt not to participate in such functionality by setting appropriate settings on their sound anonymizer(s). However, if users opt to participate, they may be provided with new bodily function sounds daily or hourly, may receive additional perks such as complimentary sound anonymizer sample packs, either for download through the Internet or in the form of, e.g., one or more preloaded physical SD cards or other preloaded data storage devices mailed or otherwise provided to the appropriate user. In this way, users of all walks of life can share their bodily function sounds. Additionally, contests may be implemented to determine who can cause their anonymizer to record the most entertaining bodily function sounds (processing may be used to rule out unnatural sounds such as whoopee cushions or other "faked" sounds, which in some embodiments may include "blowing raspberries"). Winners of such contests, which may be decided by a popular vote among users or any other means, may receive free access to new bodily function sound downloads, sample packs, and/or free copies of music or comedy albums or films that are bathroom-sound-themed or that are construed to be of bathroom-quality in some regard. This can encourage users to share their bodily function sounds with the world.

In some embodiments, sound anonymizers 100 may broadcast an "impulse" or other type of sound and record the effects to characterize a restroom. Sounds recorded by such sound anonymizers and/or the sound anonymizers themselves (if they are or are typically in static locations) may then be associated with a unique identifier such that other sound anonymizers in other restrooms may perform a similar characterization and, if the characterization is identical or similar to the characterization of another restroom, the other sound anonymizers can download sounds with unique identifiers associated with such a characterization and/or from other sound anonymizers associated with such a characterization. Thus, for example, two or more small, tiled bathrooms may share stored sounds while two or more large, wooden bathrooms may share a different set of stored sounds. These characterizations, stored sounds, etc., can be limited to a particular dwelling, building, and/or corporation or may be open to all users such that anyone who has a particular type (or character) of bathroom can make use of sounds from a similar type (or character) of bathroom. Such characterizations may be made using Fourier analysis, zero-crossing analysis, and/or other appropriate processing known in the signal processing arts (e.g., by generating signatures for each restroom as a function of one or more sets of Fourier coefficients derived from sounds or vibrations associated with an impulse sound or response, though other types of processing and/or identification known in the signal processing arts may be used, optionally utilizing training or learning algorithms, such as one or more support vector machines, or data derived therefrom).

Though exemplary embodiments have been described for recording and reproducing bowel movements and/or urination, splashes or other sounds associated with bodily function sounds may be recorded and used, either together with or independently from bowel movements and/or urination sounds. Further, in some embodiments, users or designers may load non-bodily-function sounds into anonymizer 100 such that, for example, a song or sound effect is played to anonymize a user's bodily function sounds rather than playing actual bodily function sounds. In order to generate additional income, anonymizers may include or otherwise be interfaced with (e.g., via auxiliary sound/data connections 120, 124) coin slots or other means of accepting money or currency such that the anonymization function can be enabled only for a certain period of time per a certain amount of inserted or otherwise provided money or currency. In some embodiments, users may pay money to a website that interfaces with a network of anonymizers in order to establish a "subscription" of sorts. Upon stating their name, being recognized through facial recognition, or otherwise being recognized by an anonymizer, the anonymizer may activate its functionality even if other users without subscriptions would normally have to pay to enable it. In some embodiments, anonymizers may reproduce sounds not only upon detection of bodily function sounds, but additionally and/or alternatively upon detection of a toilet lid opening, footsteps, or any other sound or vibration associated with a person in a bathroom and/or one or more bodily functions, such that anonymizing sounds may be randomly produced, optionally for a predetermined period of time from the time the anonymizer is activated, upon a user being detected by and/or entering the proximity of an anonymizer. Finally, although this disclosure refers primarily to detecting and/or reproducing sounds, vibrations may additionally or alternatively be detected and/or reproduced in much the same fashion, which may require different or additional sensors (e.g., piezoelectric sensors) than a simple microphone-based implementation.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for anonymizing bodily function sounds, comprising:
   a microphone;
   a speaker;
   memory containing computer-executable instructions for anonymizing bodily function sounds; and
   a processor,
   wherein said processor receives bodily function sounds from said microphone, said bodily function sounds being sounds resulting from urination or defecation, records said bodily function sounds to memory as saved bodily function sounds, monitors said microphone for further bodily function sounds, and broadcasts one or more of said saved bodily function sounds over said speaker upon detecting new bodily function sounds.

2. A system according to claim 1, further comprising attachments designed and configured for engaging at least a portion of the system with a portion of a toilet.

3. A system according to claim 1, wherein monitoring said microphone for further bodily function sounds includes analyzing sounds using Fourier analysis or zero-crossing analysis to identify bodily function sounds.

4. A system according to claim 1, wherein the processor identifies a user as a function of said new bodily function sounds and selects said one or more of the saved bodily function sounds as a function of the identified user.

5. A system according to claim 4, wherein said one or more of the saved bodily function sounds are selected as a function of preferences associated with the identified user that were configured by the user.

6. A system according to claim 5, wherein the preferences are received through an Internet connection.

7. A system according to claim 5, wherein the preferences are received through an interface with a mobile phone.

8. A system according to claim 1, wherein the processor identifies a user by interfacing with a mobile phone and selects said one or more of said saved bodily function sounds as a function of the identified user.

9. A system according to claim 1, wherein the processor analyzes said bodily function sounds and applies an effect to said one or more of the saved bodily function sounds as a function of the result of the analysis of said bodily function sounds.

10. A system according to claim 1, wherein the processor prevents broadcasting of sounds for a period of time greater than one minute upon receiving an appropriate command from a user.

11. A method of anonymizing bodily function sounds performed by one or more processors or non-transitory machine-readable storage medium containing machine-executable instructions that, when executed by one or more processors, cause the one or more processors to perform said method, the method comprising:

receiving bodily function sounds from a microphone, said bodily function sounds being sounds resulting from urination or defecation;
   recording the bodily function sounds to a memory as saved bodily function sounds;
   monitoring a microphone to detect further bodily function sounds, said bodily function sounds being sounds resulting from urination or defecation; and
   broadcasting one or more of the saved bodily function sounds over a speaker upon detection of new bodily function sounds via the microphone.

12. A method or non-transitory machine-readable storage medium according to claim 11, wherein monitoring a microphone to detect further bodily function sounds includes analyzing sounds using Fourier analysis or zero-crossing analysis to identify bodily function sounds.

13. A method or non-transitory machine-readable storage medium according to claim 11, the method further comprising identifying a user as a function of the new bodily function sounds and selecting said one or more of the saved bodily function sounds as a function of the identified user.

14. A method or non-transitory machine-readable storage medium according to claim 11, wherein said one or more of the saved bodily function sounds are selected as a function of preferences associated with the identified user that were configured by the user.

15. A method or non-transitory machine-readable storage medium according to claim 14, wherein the preferences are received through an Internet connection.

16. A method or non-transitory machine-readable storage medium according to claim 14, wherein the preferences are received through an interface with a mobile phone.

17. A method or non-transitory machine-readable storage medium according to claim 11, the method further comprising identifying a user by interfacing with a mobile phone and selecting said one or more of the saved bodily function sounds as a function of the identified user.

18. A method or non-transitory machine-readable storage medium according to claim 11, the method further comprising analyzing said bodily function sounds and applying an effect to said one or more of the saved bodily function sounds as a function of the result of the analysis of said bodily function sounds.

19. A method or non-transitory machine-readable storage medium according to claim 11, the method further comprising preventing broadcasting of sounds for a period of time greater than one minute upon receiving an appropriate command from a user.

20. A method or non-transitory machine-readable storage medium according to claim 11, the method further comprising preventing recording of sounds for a period of time greater than one minute upon receiving an appropriate command from a user.

* * * * *